United States Patent [19]

Nielsen

[11] Patent Number: 4,477,639

[45] Date of Patent: Oct. 16, 1984

[54] OLEFIN POLYMERIZATION CATALYST COMPONENT AND COMPOSITION AND METHOD OF PREPARATION

[75] Inventor: Robert P. Nielsen, Houston, Tex.

[73] Assignee: Shell Oil Company, Houston, Tex.

[21] Appl. No.: 499,012

[22] Filed: May 27, 1983

[51] Int. Cl.³ .......................... C08F 4/02; C08F 10/00
[52] U.S. Cl. ..................... 526/124; 502/109;
502/127; 502/128; 502/133; 526/144; 526/351;
526/904
[58] Field of Search .............. 502/109, 127, 128, 133;
526/124, 125, 144, 904

[56] References Cited

U.S. PATENT DOCUMENTS

| | | | |
|---|---|---|---|
| 3,396,155 | 8/1968 | Delbouill et al. | 526/904 |
| 4,148,754 | 4/1979 | Strobel et al. | 526/129 |
| 4,182,811 | 1/1980 | Bocharov et al. | 526/904 |
| 4,329,253 | 5/1982 | Goodall et al. | 252/429 B |
| 4,343,721 | 8/1982 | Goodall et al. | 252/429 B |
| 4,426,318 | 1/1984 | Fries et al. | 526/124 |

FOREIGN PATENT DOCUMENTS

| | | | |
|---|---|---|---|
| 1884672 | 6/1969 | Japan . | |
| 1128724 | 10/1968 | United Kingdom | 526/142 |

*Primary Examiner*—Edward J. Smith
*Attorney, Agent, or Firm*—Dean F. Vance

[57] ABSTRACT

A polymer-supported constituent for olefin polymerization catalyst obtained by: mixing in organic solution a chlorine-containing organic polymer and a magnesium compound, removing the solvent, and reacting the resulting magnesium-modified polymer with a titanium halide. An olefin polymerization catalyst is formed by mixing such a polymer-supported constituent with an appropriate organo-metallic compound and optionally also an appropriate selectivity control agent.

10 Claims, No Drawings

OLEFIN POLYMERIZATION CATALYST COMPONENT AND COMPOSITION AND METHOD OF PREPARATION

BACKGROUND OF THE INVENTION

1. Field of the Invention

The present invention relates to a polymer-supported constituent for olefin polymerization catalysts, and in particular to a constituent comprising titanium supported on a magnesium-modified chlorine-containing organic polymer, together with an olefin polymerization catalyst containing said polymer-supported constituent and also a process for the polymerization of olefins using such catalysts.

2. Description of the Prior Art

When olefins are polymerized using conventional titanium/organoaluminum catalysts (Ziegler or Ziegler-Natta catalysts), it is necessary to extract the residual catalyst so as to reduce the titanium level in the polymer product below that at which it adversely affects polymer properties, a procedure known as de-ashing. Increasing catalyst activity will result in lower levels of catalyst residue, thereby offering the potential for reducing this residue to a level acceptable in the final product and so eliminating the need for the deashing step. One technique for increasing catalyst activity is to support the titanium on a substrate. Recent developments have yielded highly active catalysts in which the titanium is supported on an active form of magnesium halide, as described in, for example, U.S. Pat. Nos. 4,329,253 and 4,343,721. However, although the increased activity resulting from the use of the magnesium halide support achieves a substantial reduction in titanium residues, the support itself contributes other residues which are not necessarily innocuous. Excessive magnesium content in the polymer can lead to moisture adsorption and to water carryover in film fabrication. Excessive chloride content in the polymer can cause corrosion of fabricating equipment. For these reasons, it would be advantageous to provide a support for a Ziegler catalyst which enhances the activity of the titanium but does not itself contribute residual metals or anions in the polymer product. The use of a polymer support has been disclosed in Japanese Patent Publ. No. 18846/72, which describes a catalyst consisting of (a) a transition metal compound prepared by adhering a halide of magnesium or manganese to the surface of polyolefin or halogenated polyvinyl particles and fixing a titanium or vanadium halide to that coated particle surface, and (b) an organic aluminum or zinc compound. However, the properties of such a catalyst are inevitably critically dependent on the physical characteristics of the polymer particles.

SUMMARY OF THE INVENTION

The present invention provides a polymer-supported constituent for olefin polymerization catalysts obtained by:
(a) mixing in organic solution a chlorine-containing organic polymer and a magnesium compound,
(b) removing the organic solvent to form a magnesium-modified polymer,
(c) reacting the magnesium-modified polymer with a halogenated titanium compound.

In a further aspect, the invention also relates to a process for the preparation of such a polymer-supported catalyst constituent by: (a) mixing in organic solution a chlorine-containing organic polymer and a magnesium compound, (b) removing the organic solvent to yield a magnesium-modified polymer, and (c) treating the magnesium-modified polymer with a halogenated titanium compound.

Activation of this polymer-supported catalyst constituent with an organo-metallic compound of a metal of Group II or III of the Mendeleev Periodic Table yields an olefin polymerization catalyst of very high activity which, when used in conjunction with a selectivity control agent for polymerization of propylene, achieves good selectivity to isotactic polypropylene.

DETAILED DESCRIPTION OF THE INVENTION

The basic objective in mixing together the organic polymer and the magnesium compound is to produce a vinyl backbone on which magnesium is supported in a form capable of reacting with a titanium halide to provide a polymer-supported catalyst constituent in which a vinyl backbone supports a catalytically effective loading of both magnesium and titanium. I have discovered that this objective can be attained if a chlorine-containing polymer and a magnesium compound are mixed together in organic solution. This may be achieved by adding the solid magnesium compound and the solid polymer to an organic solvent in which both components are soluble. Alternative, and equally acceptable, procedures are to add the solid magnesium compound to a solution of the polymer in an organic solvent in which the magnesium compound is also soluble; to add the solid polymer to a solution of the magnesium compound in an organic solvent in which the polymer is also soluble; or to mix together an organic solution of the polymer with an organic solution of the magnesium compound. In this last procedure, it is not essential that the same solvent be used for both the polymer and the magnesium compound, provided that the two different solutions are miscible. However, if the organic solvent, polymer and magnesium compound are selected so that the same solvent will dissolve both solids the operation of the overall process, and in particular the recovery and reuse of the solvent, is considerably simplified. I have found that a magnesium salt of an aromatic carboxylic acid, such as benzoic acid or salicylic acid, can be dissolved in the same solvent as a poly(vinyl chloride/vinylidene chloride) copolymer, specifically in hot tetrahydrofuran (THF). More particularly, it was found that anhydrous magnesium benzoate, although insoluble in completely dry THF, is soluble in hot THF which has not been scrupulously dried, and that this same solvent material will also dissolve a 12/88 poly(vinyl chloride/vinylidene chloride) copolymer. Alternative polymers may be used, provided that they have suitable solubility characteristics, but in general it is desirable to maximize the chlorine content of the polymer since it is believed that the magnesium coordinates with the chlorine atoms.

The organic solution of chlorine-containing polymer and magnesium compound is suitably mixed by stirring at a temperature at which both components remain in solution, suitably above ambient temperature but below that at which the solvent distils off, e.g., about 50° C. The relative proportions of polymer and magnesium compound are conveniently such as to achieve the most effective utilization of the magnesium, and since it is believed that each magnesium atom coordinates with two adjacently located chlorine atoms of the polymer, the preferred proportions are such that the magnesium/chlorine (in polymer) ratio is about 1:2. After a period of time sufficient to achieve adequate absorption of the magnesium onto the vinyl backbone, usually between about 30 to about 60 minutes, the solvent is removed, suitably by distillation, to yield a magensium-modified polymer as a solid.

This magnesium-modified polymer is then converted to the desired polymer-supported catalyst constituent by reaction with a halogenated titanium compound, suitably titanium tetrachloride. This reaction is conveniently carried out by contacting the magnesium-modified polymer directly with the titanium halide at elevated temperature. The resulting product can then be used as an olefin polymerization catalyst by combining it with, as activator, an organo-metallic compound of a metal of Group II or III of the Mendeleev Periodic Table, suitably a trialkyl aluminum. When the resultant catalyst is used in the polymerization of propylene, the yield of isotactic polypropylene is greatly enhanced by the incorporation of a selectivity control agent (SCA), which is suitably an electron donor compound such as an oxygenated organic or inorganic acid, in particular p-ethyl anisate. The actual procedure for the olefin polymerization reaction may follow any of those well established in the art, but is conveniently a bulk polymerization in liquid propylene as reactant and reaction solvent.

The invention is further illustrated by reference to the following Example, which is given for the purpose of illustration only and is not meant to limit the invention to the particular reactants and conditions described therein.

EXAMPLE 3.85 g anhydrous magnesium benzoate and 1.46 g of a 12/88 poly(vinyl chloride/vinylidene chloride) copolymer were dissolved in 165 ml tetrahydrofuran (THF) which had not been scrupulously dried. The THF was heated to 60° C. until all the added solids had dissolved, and the resulting solution then maintained at 50° C. for 1 hour with mixing. The THF solvent was then distilled off under reduced pressure at 30° C. under a stream of nitrogen. The resulting solid magnesium-modified polymer was added to 50 ml titanium tetrachloride and heated for 1 hour at 70° C. The reaction mixture was then cooled, filtered, washed with n-heptane to remove excess TiCl₄, and then dried under nitrogen to yield a polymer-supported catalyst containing 8.3%wt Ti; 15.5% Mg and 44.0%wt Cl. This catalyst was evaluated for the bulk liquid polymerization of propylene.

The polymerization was carried out in a 1 gallon autoclave which was charged with 2700 ml of liquid propylene. 422 mg (3.7 m mole) of triethyl aluminum was added as cocatalyst, followed by sufficient procatalyst to provide 0.037 m atom Ti. 2%v hydrogen was added to control the molecular weight of the polypropylene product, and the reaction mass maintained at 60° C., with stirring at 1500 rpm, for 2 hours. In two evaluations p-ethyl anisate (p-EA) was also added as a selectivity control agent before addition of the procatalyst (the Al/p-EA ratio being as noted), and in the third case this agent was omitted. The polypropylene product was recovered after 2 hours reaction, and its content of atactic material assessed by determining the percentage of xylene soluble material XS% (after dissolving the polymer in boiling xylene and cooling). The results of the 3 evaluations are set out below.

| Al/Ti Ratio | Al/p-EA | ACTIVITY gPP/gTi | gPP/g Catalyst | % XS |
|---|---|---|---|---|
| 100 | No SCA | 493,700 | 40,977 | >25% |
| 100 | 3.13 | 134,900 | 11,196 | ND |
| 40 | 3.15 | 45,000 | 3,735 | 12.8 |

What is claimed is:
1. A polymer-supported constituent for olefin polymerization catalysts obtained by:
    (a) mixing in organic solution a chlorine-containing organic polymer and a magnesium compound,
    (b) removing the organic solvent to form a magnesium-modified polymer,
    (c) reacting the magnesium-modified polymer with a halogenated titanium compound, wherein the chlorine-containing organic polymer is a poly(vinyl chloride/vinylidene chloride) copolymer and the magnesium compound is a magnesium salt of an aromatic carboxylic acid.
2. A catalyst constituent as claimed in claim 1 wherein the halogenated titanium compound is titanium tetrachloride.
3. A catalyst constituent as claimed in claim 1 wherein the organic solvent is tetrahydrofuran.
4. A polymer-supported constituent for olefin polymerization catalysts obtained by:
    (a) adding a poly(vinyl chloride/vinylidene chloride) copolymer and a magnesium salt of an aromatic carboxylic acid to an organic solvent capable of dissolving both the copolymer and the salt,
    (b) mixing the resultant solution at a temperature above ambient but below that at which the solvent distils off,
    (c) removing the organic solvent to form a magnesium-modified polymer,
    (d) reacting the magnesium-modified polymer with titanium tetrachloride.
5. A catalyst constituent as claimed in claim 4 wherein the organic solvent is tetrahydrofuran and the magnesium salt is magnesium benzoate.
6. A process for the preparation of a polymer-supported constituent for olefin polymerization catalysts which comprises:
    (a) mixing in organic solution a chlorine-containing organic polymer and a magnesium compound,
    (b) removing the organic solvent to yield a magnesium-modified polymer,
    (c) reacting the magnesium-modified polymer with a halogenated titanium compound to form a polymer-supported catalyst-forming component, wherein the chlorine-containing organic polymer is a poly(vinyl chloride/vinylidene chloride) copolymer and the magnesium compound is a magnesium salt of an aromatic carboxylic acid.
7. A catalyst for the polymerization of olefins, obtained by mixing a polymer-supported catalyst constituent as defined in claim 1 with an organic-metallic compound of a metal of Group II or III of the Mendeleev Periodic Table, and optionally also an electron donor compound as selectivity control agent.
8. Catalyst as claimed in claim 7 wherein the organometallic compound is a trialkyl aluminum and the selectivity control agent is an ester of an oxygenated organic or inorganic acid.
9. Catalyst as claimed in claim 8 wherein the selectivity control agent is p-ethyl anisate.
10. Process for the polymerization of olefins which comprises contacting at least one ethylenically unsaturated hydrocarbon with a catalyst as defined in claim 7.

* * * * *